(12) United States Patent
Chiba et al.

(10) Patent No.: US 6,798,544 B1
(45) Date of Patent: Sep. 28, 2004

(54) IMAGE READING METHOD, IMAGE READING DEVICE AND IMAGE PROCESSING DEVICE

(75) Inventors: Hirotaka Chiba, Kanagawa (JP);
Tsugio Noda, Kanagawa (JP);
Fumitaka Abe, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/576,891

(22) Filed: May 24, 2000

(30) Foreign Application Priority Data

Jul. 21, 1999 (JP) .......................................... 11-206775

(51) Int. Cl.[7] .............................................. H04N 1/40
(52) U.S. Cl. .................................. 358/3.22; 358/3.21
(58) Field of Search ................................ 358/461, 521, 358/522, 3.21–3.22, 1.9, 3.24, 3.06–3.09; 382/237, 169, 172

(56) References Cited

U.S. PATENT DOCUMENTS 4,601,057 A * 7/1986 Tsuji et al. ................. 382/172
4,663,662 A * 5/1987 Sekizawa et al. ........... 358/530

FOREIGN PATENT DOCUMENTS

JP 2-142271 5/1990

* cited by examiner

*Primary Examiner*—Thomas D. Lee
*Assistant Examiner*—Stephen Brinich
(74) *Attorney, Agent, or Firm*—Armstrong, Kratz, Quintos, Hanson & Brooks, LLP

(57) ABSTRACT

The present invention comprises an image reading unit for reading an image recorded on a medium, a gradation histogram generation unit for generating the gradation histogram distribution of the image data read by the image reading unit, a threshold value generation unit for calculating an appearance frequency ratio between the lowest gradation value and the highest gradation value from the image data read by the image reading unit, determining a threshold value level based on the calculated appearance frequency ratio and further determining the threshold value level based on the gradation histogram distribution generated by the gradation histogram generation unit, and a binarization unit for binarizing the read image data based on the determined threshold value level. Therefore, a threshold value can be generated based on the features of an image to be read, an optimal threshold value can be obtained depending on a medium and, as a result, a correct binarization process is available.

12 Claims, 19 Drawing Sheets

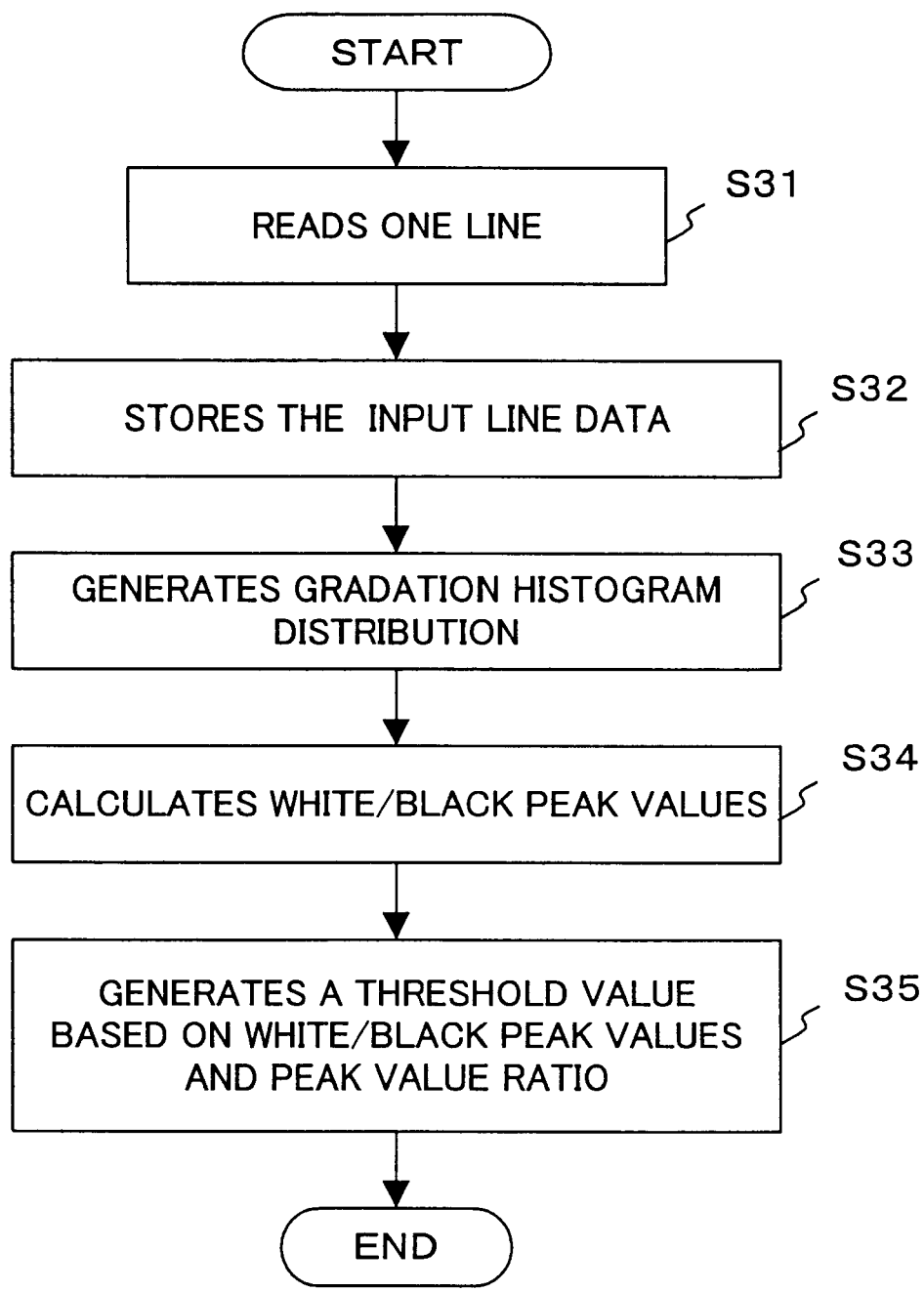
F I G. 3 A

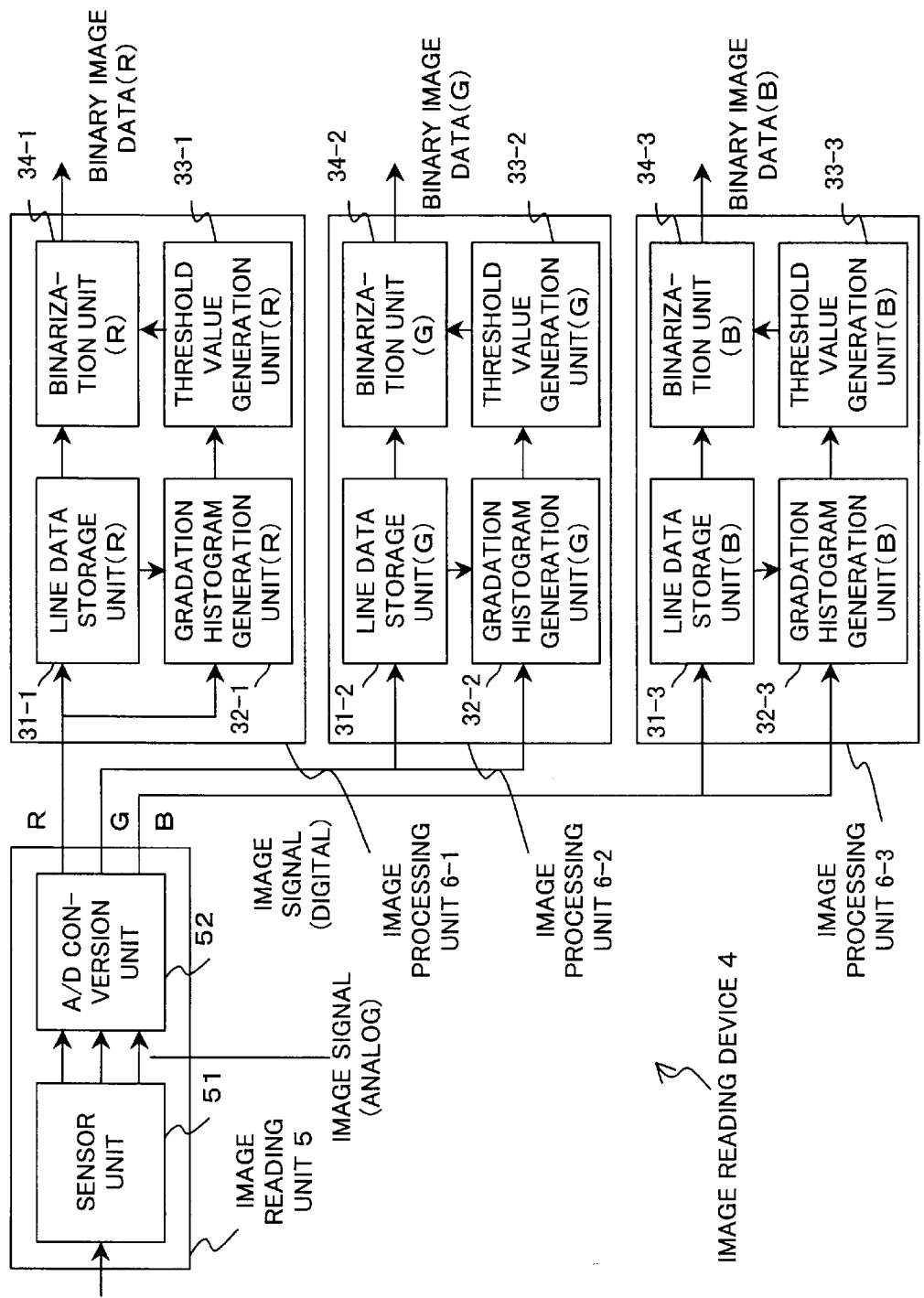
F I G. 4

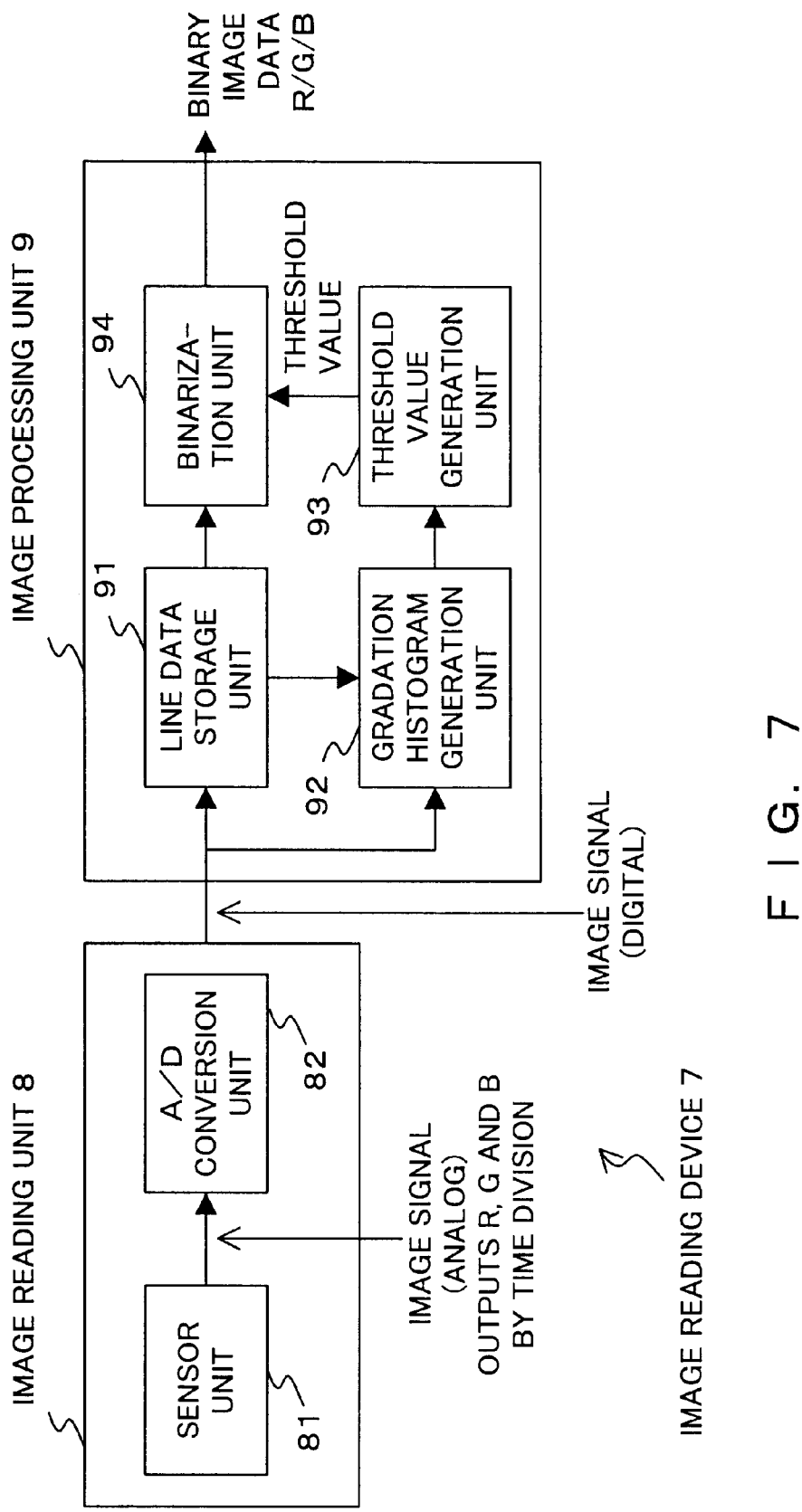
F I G. 7

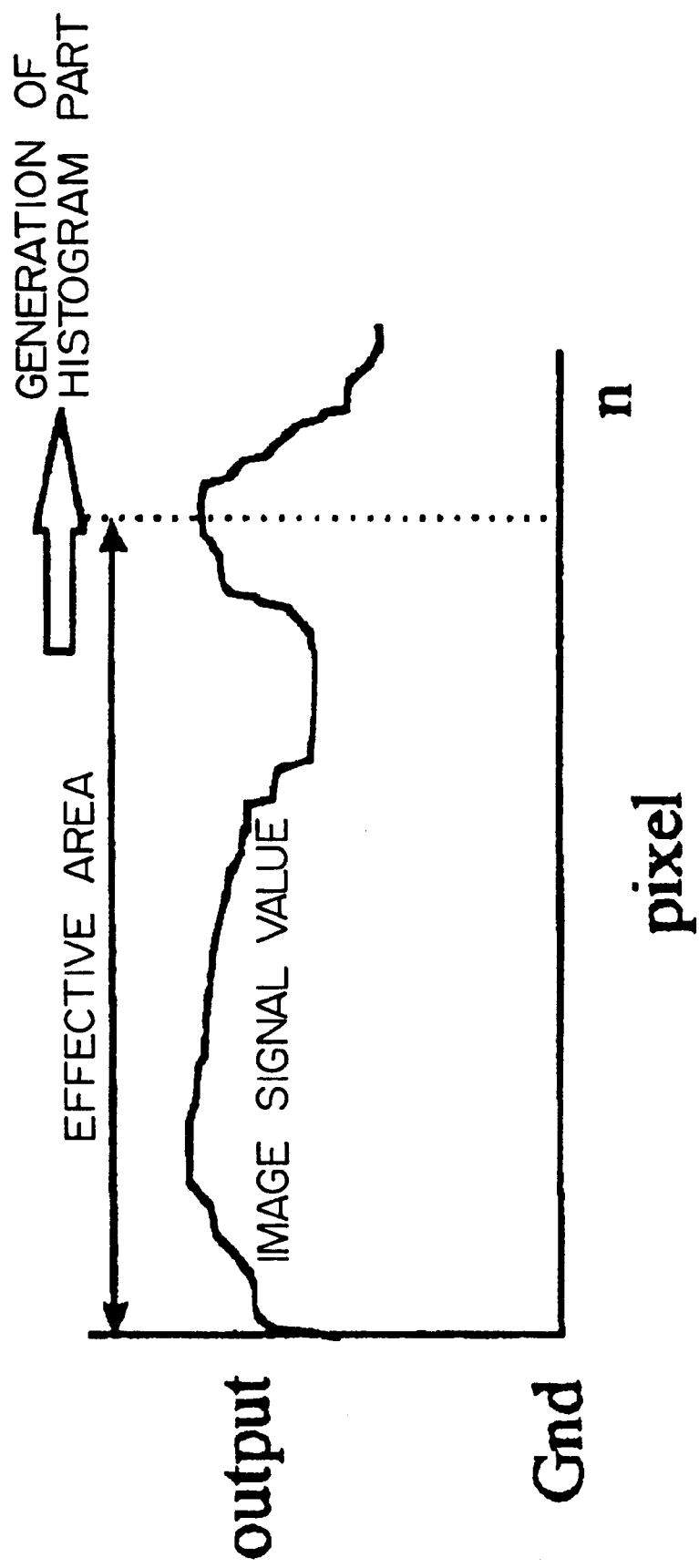
F I G. 14

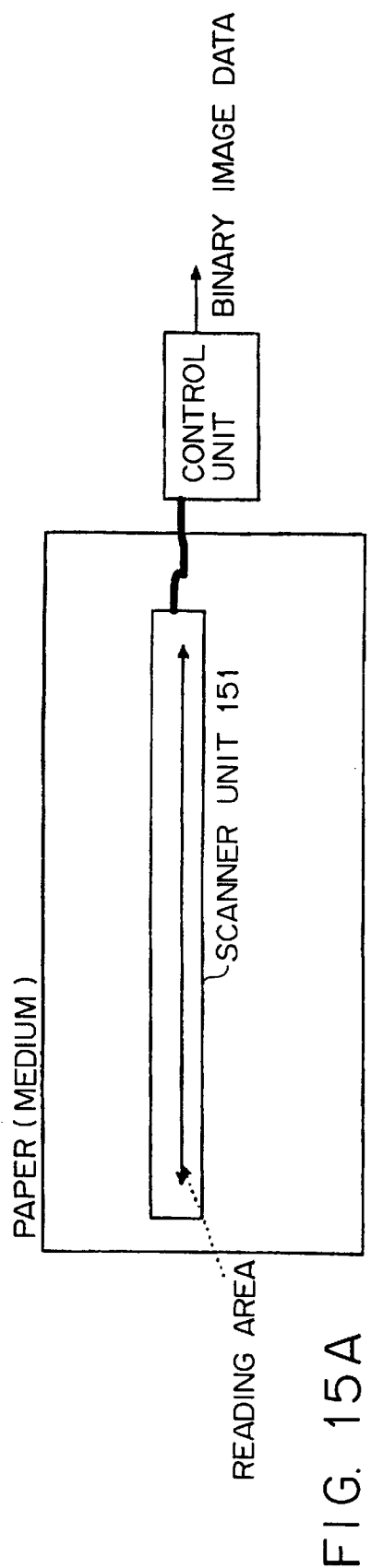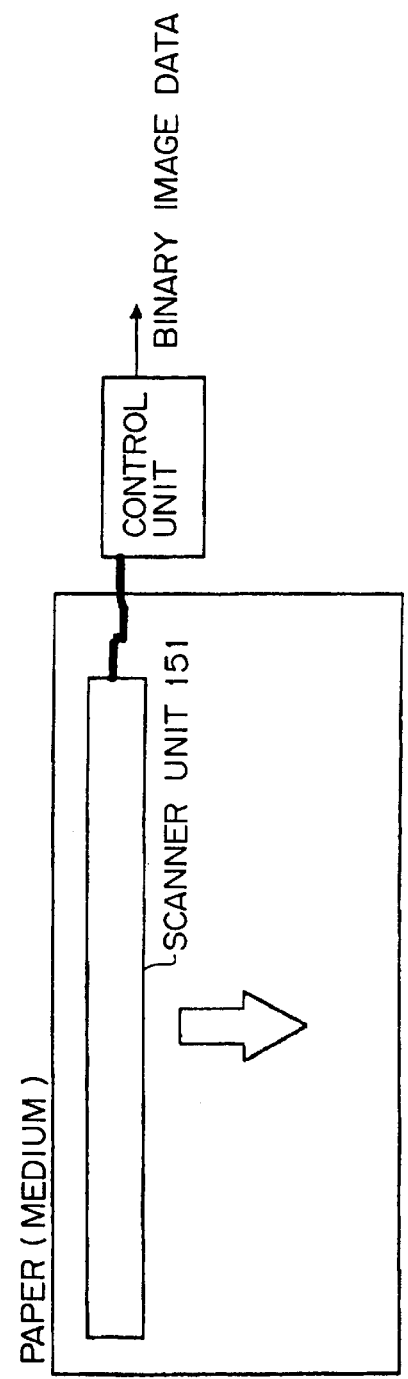
FIG. 15A
FIG. 15B

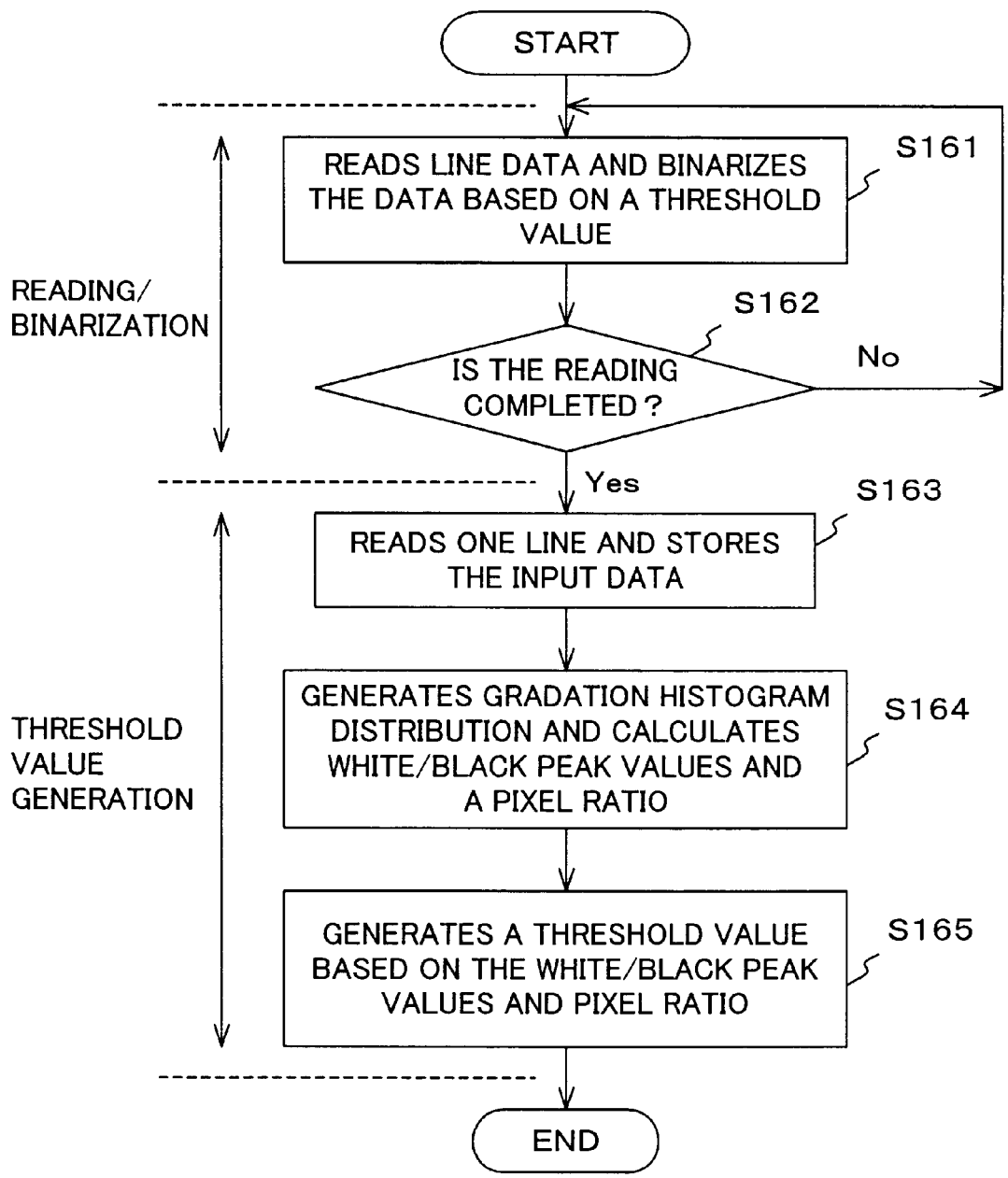
F I G. 16

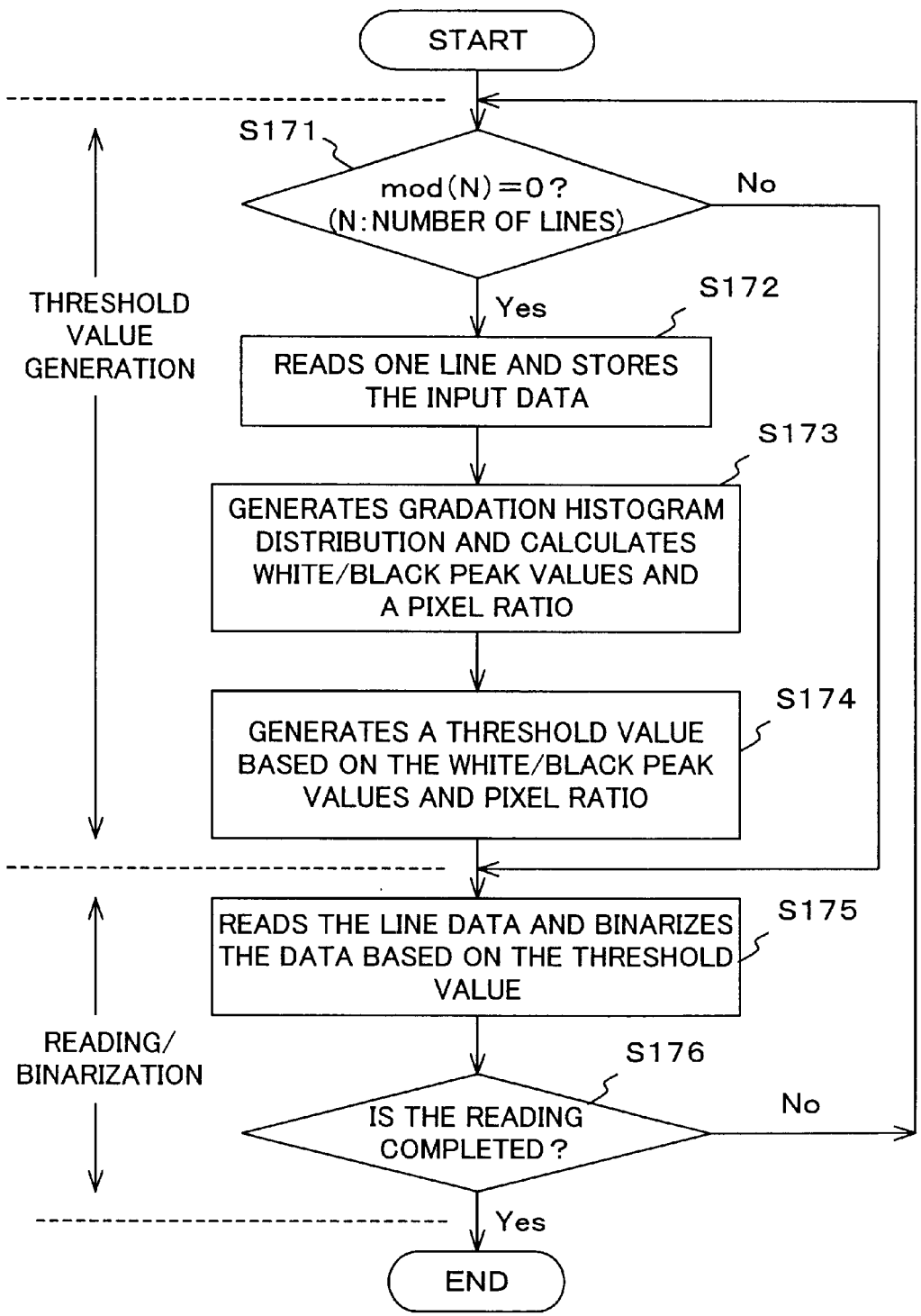
F I G. 17

IMAGE READING METHOD, IMAGE READING DEVICE AND IMAGE PROCESSING DEVICE

BACKGROUND OF THE INVENTION

1. Field of the Invention

The present invention relates to an image reading method using an image scanner, facsimile, etc., the image reading device thereof and the image processing device for processing read images. In particular, the present invention relates to an image reading method for binarizing read image data and the image reading device thereof and the image processing device thereof.

2. Description of the Related Art

Conventionally, if input images are binarized, the peak value of read values is obtained based on a one-line reading of an inputted manuscript, as disclosed in Japanese Patent Laid-open No. 2-142271 (Japanese Patent Application No. 63-296557). Then, a storage circuit for storing the obtained peak value is provided, and the stored peak value is used as a threshold reference value for binarization.

FIGS. 1A and 1B show a conventional threshold value generation, and a level at the prescribed ratio (for example, 50%) to the peak value (Vref) of a read image is used as a threshold value.

The respective peak values of the colors white and black are calculated and the intermediate value (for example, a half) is also used as a threshold value for binarization.

However, both the sensitivity of a sensor for reading images and the lightness of a light source sometimes varies widely and in such a case, the read value of an image fluctuates widely. Therefore, even if the one-line peak value is stored and is used as a reference value for binarization, an error occurs between the obtained peak value and a real peak value since there is a wide fluctuation in input values. For this reason, correct binarization is not performed, which is a problem.

Even if the same value can be obtained in both a white peak value and a black peak value, there is a possibility that the gradation tendency of each image may differ.

Since in the conventional threshold value calculation, a threshold value is uniquely determined based on a peak value, there is a possibility that a binarization process may not be performed well depending on the gradation tendency of an image to be read.

SUMMARY OF THE INVENTION

An object of the present invention is to solve such problems and to implement an image reading method for stably binarizing images, and to suggest the image reading device thereof and the image processing device thereof.

The image reading device of the present invention comprises an image reading unit, a threshold value generation unit, a binarization unit and a gradation histogram generation unit.

In the first aspect of the present invention, the image reading unit reads images recorded on a medium. The threshold value generation unit calculates the ratio of appearance frequency between the lowest gradation value and the maximum gradation value from image data read by the image reading unit, and determines a threshold value level based on the calculated ratio. The binarization unit binarizes the read image data based on the determined threshold value level.

In the second aspect of the present invention, the image reading unit reads images recorded on a medium. The threshold value generation unit calculates the ratio of appearance frequency between the lowest gradation value and the highest gradation value from image data read by the image reading unit, and determines a threshold value level based on the calculated ratio. The binarization unit binarizes the read image data based on the determined threshold value level. The gradation histogram generation unit generates the generated gradation histogram distribution of the image data read by the image reading unit. Furthermore, the threshold value generation unit determines the threshold value level based on gradation histogram distribution generated by the gradation histogram generation unit.

BRIEF DESCRIPTION OF THE DRAWINGS

The present invention will become more apparent from the following description of the preferred embodiments, and with reference to the accompanying drawings, in which:

FIG. 3A is a flowchart showing the threshold value generation process of the image reading unit in the first preferred embodiment;

FIG. 4 shows an example of the image reading device in the second preferred embodiment of the present invention, and, in particular, shows an example of the device in which images are inputted in color;

FIG. 7 shows the configuration of the image reading unit in the third preferred embodiment;

FIG. 14 shows the read image gradation distribution in the case where an effective area is smaller than a reading area;

FIG. 15A shows the relationship between the line input data storage of images for determining a threshold value and the actual reading process of images in each of the above-described preferred embodiments (No. 1), and it shows one line data input at the time of reading images;

FIG. 15B shows the relationship between the line input data storage of images for determining a threshold value and the actual reading process of images in each of the above-described preferred embodiments (No. 2), and it shows one line data input at the time of reading images;

FIG. 16 is a flowchart showing a threshold value generation process and a procedure for generating a threshold value based on the end line of images;

FIG. 17 is a flowchart showing another threshold value generation procedure.

DESCRIPTION OF THE PREFERRED EMBODIMENTS

The preferred embodiments of the present invention are described in detail below with reference to the drawings.

The above-described problem can be solved by using an image reading method for calculating both the lowest gradation value and the highest gradation value of an image recorded on a medium, calculating the ratio of appearance frequency between the lowest and highest gradation values and determining a threshold value level used for a binarization process based on the calculated ratio, the image reading device thereof and the image processing device thereof.

In particular, the lowest and highest gradation values can be calculated based on the generated gradation histogram distribution of a read image.

The above-described set of the lowest and highest gradation values can also be replaced with a set of the most frequent low gradation value and the most frequent high gradation value.

In the case the image reading device is color-readable, it is sufficient if the ratio between the lowest and highest gradation values is calculated for each piece of image data corresponding to each read color, a threshold value level is determined for each color and the image data corresponding to each color are binarized based on the threshold value level determined for each color.

Figure 1A:
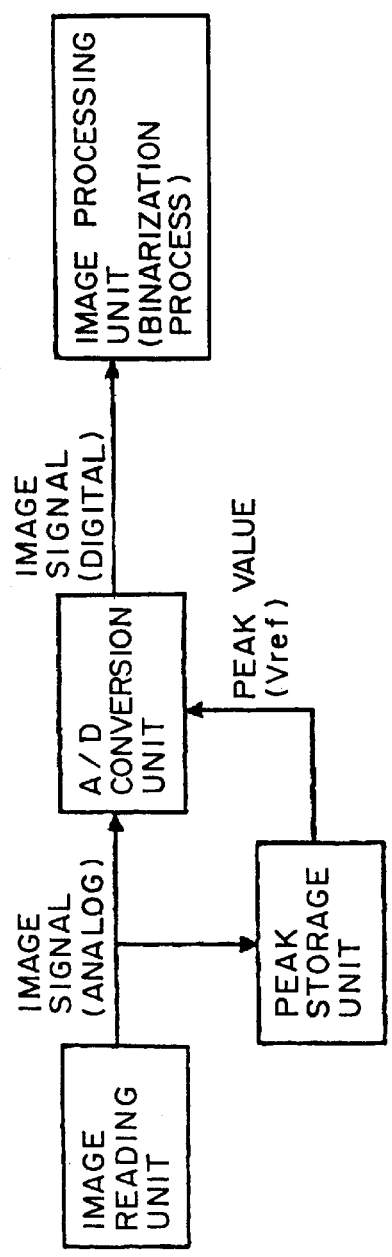
FIG. 1A shows the functional configuration of a conventional image reading device.
Figure 1B:
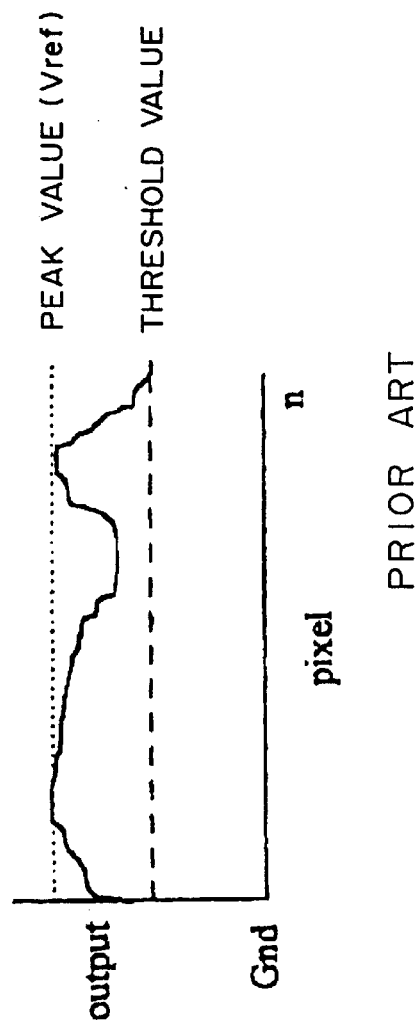
FIG. 1B shows the conventional threshold value generation.
Figure 2:
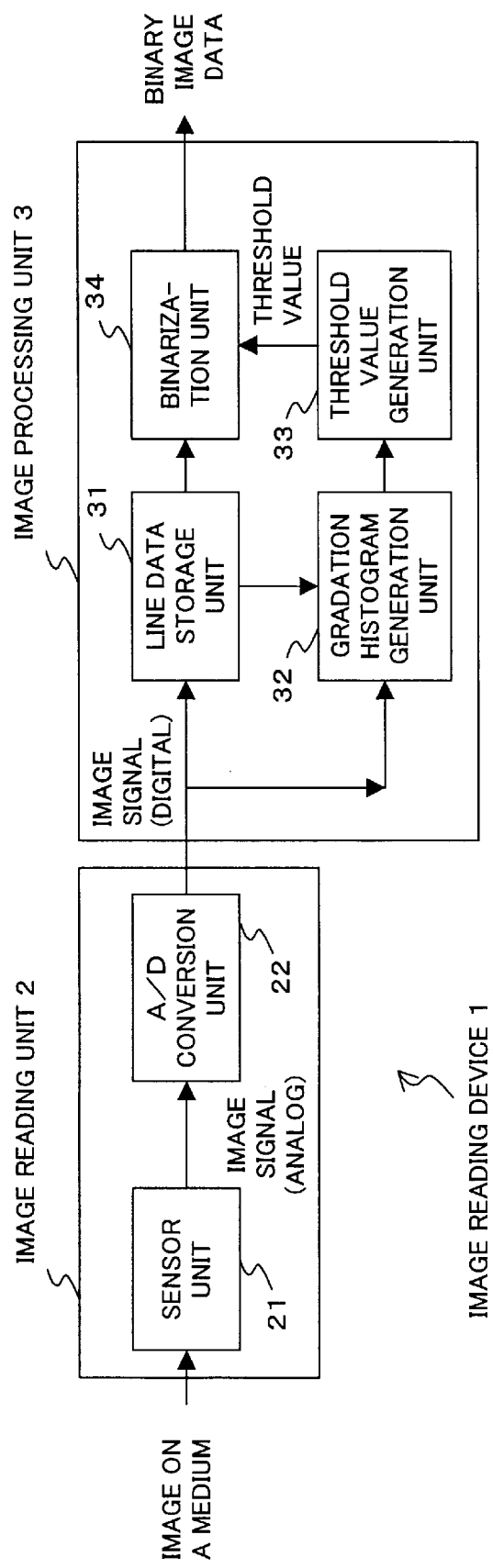
FIG. 2 shows an example of the image reading device in the first preferred embodiment of the present invention and in particular, shows an example of the device in which monochrome images are inputted.

FIG. 2 shows an example of the image reading device in the first preferred embodiment of the present invention, and, in particular, shows an example of the device in which monochrome images are inputted.

In FIG. 2, an image reading device 1 comprises an image reading unit 2 for optically reading an image recorded on a medium, converting the read data into an electric signal with a value corresponding to the gradation and outputting the electric signal, and an image processing unit 3 for binarizing the image signal outputted from the image reading unit 2. The image reading unit 2 and image processing unit 3 can be installed in the same device or can be installed separately as independent devices. As an example of the latter case, there is the case where a portable image reading device is connected to a personal computer.

The image reading unit 2 comprises a sensor unit 21 for optically reading an image on a medium and outputting an analog image signal corresponding to the gradation and an A/D conversion unit 22 for converting the analog signal outputted from the sensor unit 21 to a digital signal.

For the sensor unit 21, for example, a line sensor/CCD is used. The A/D conversion unit 22 transmits digital signals of, for example, eight bits. The colors white and black are outputted as 255 and 0, respectively, in the decimal system.

The image processing unit 3 comprises a line data storage unit 31, a gradation histogram generation unit 32, a threshold value generation unit 33 and a binarization unit 34.

The digital signal outputted from the image reading unit 2 is inputted to the image processing unit 3. The inputted digital signal is temporarily stored in the line data storage unit 31. The line data storage unit 31 temporarily stores image data for one line as suggested by the name. The inputted digital data are also temporarily stored in the line data storage unit 31 and/or are inputted to the gradation histogram generation unit 32 via the line data storage unit 31. The gradation histogram generation unit 32 generates a gradation histogram distribution based on the inputted image data. Then, the output from the generated gradation histogram distribution is transmitted to the threshold value generation unit 33. The threshold value generation unit 33 generates a threshold value used to binarize the input image data based on the ratio between the highest and lowest gradation values of the generated gradation histogram distribution.

Both the input image data stored in the line data storage unit 31 and the threshold value generated by the threshold value generation unit 33 are transmitted to the binarization unit 34. The binarization unit 34 binarizes the input image data inputted from the line data storage unit 31 based on the threshold value level inputted from the threshold value generation unit 33.

Then, the operation of the image reading device in the first preferred embodiment is described.

If an image (including character information) recorded on an extremely white medium is read, the gradation of the input data is distributed between the gradation of the background of the medium and the gradation of an image/character part. In this case, the gradation of the background of the medium and the gradation of the image forming part (ink part) are considered to be the highest and lowest gradations, respectively.

In the case of a general image, there is space between characters in a character area. Therefore, even if a character area is read, the gradation of the background of a medium is also distributed at a specific ratio. The distribution of the line part of a character also includes the gradation level of ink at a specific ratio. Therefore, both the background level of the medium and the black level of the character part can be detected by calculating the generated gradation histogram distribution of an inputted image.

In this case, since the boundary part between a character and a background is affected by the gradation of the background part, the gradation distribution in the edge part of a character is gradual. This gradual gradation distribution of the gradation distribution is affected by the ratio between the gradation of the background and the gradation of the character part. Therefore, the size of a character on a medium can be faithfully reproduced by determining a binarization threshold value based on the ratio between the lowest gradation (character part) and the highest gradation (background part).

Even the ratio between the highest gradation of the background and the lowest gradation of the character part of the input data of a sensor in which sensitivity fluctuates due to the sensor itself and lighting can be stored as a reference value based on the generated gradation histogram of the input data. A threshold value level to be determined never exceeds the highest gradation value or falls below the lowest gradation value by generating a threshold value based on this stored reference (corresponding to the ratio between the highest and lowest gradation values), and as a result, correct binarization which faithfully reflects the size of a character on a medium is available.

Figure 3B:
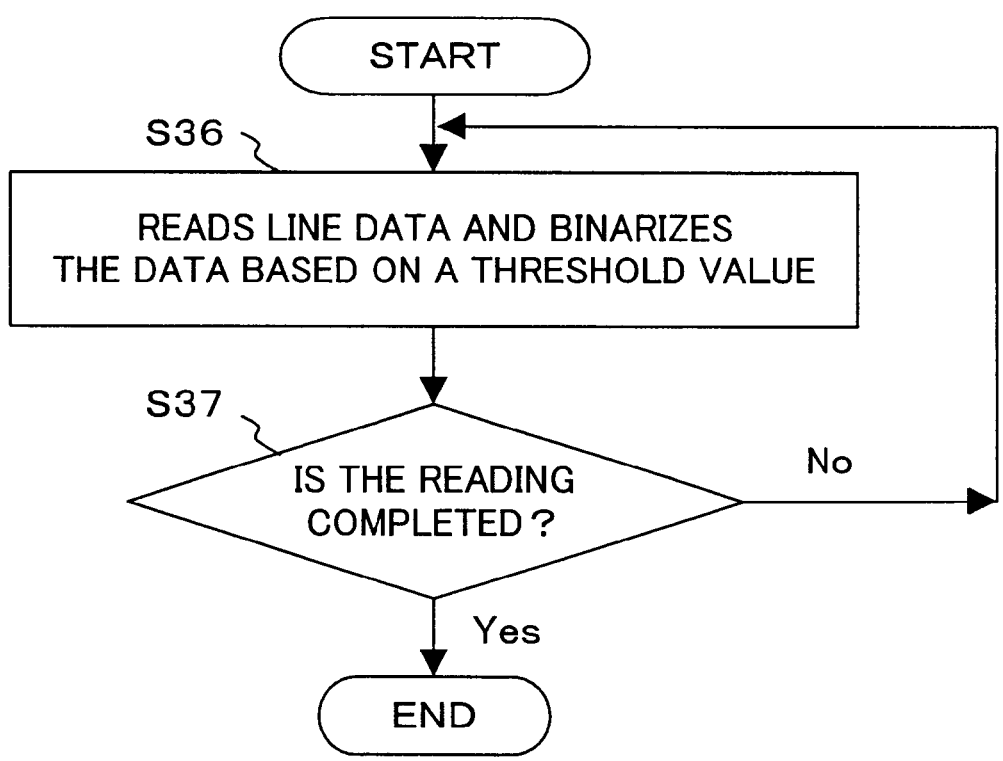
FIG. 3B is a flowchart showing the binarization process of the image reading unit in the first preferred embodiment.

FIGS. 3A and 3B are flowcharts showing the operation of the image reading device in the first preferred embodiment.

FIG. 3A shows the process of performing the line input of a background including a part including characters (character area) on a medium, generating a gradation histogram and generating a threshold value level based on the generated gradation histogram distribution, and FIG. 3B shows a binarization process.

If in FIG. 3A, the input of an image starts, in step S31, an image for one line is read. In step S32, the read image data for one line are stored in the line data storage unit 31. In step S33, the image data for one line stored in the line data storage unit 31 are transferred to the gradation histogram generation unit 32, and generated gradation histogram distribution for the image for one line is generated in the gradation histogram generation unit 32. More specifically, the gradation histogram generation unit 32 judges a gradation value for each pixel of the input image data and generates gradation histogram distribution based on the judged gradation value. Although image data for one line inputted to the gradation histogram generation unit 32 can be transferred from the line data storage unit 31, as described above, the read image for one line can also be used without being stored in the line data storage unit 31.

Then, in step S34, both the highest gradation peak value indicating the color white of the background and the lowest gradation peak value indicating the color black of the image are calculated based on the generated gradation histogram distribution. In step S35, the ratio between the calculated highest and lowest peak values is calculated, and the threshold value generation unit 33 determines a threshold value level based on the ratio.

Then, the threshold value generation unit 33 passes the determined threshold value level to the binarization unit 34 for performing a binarization process, which is described below with reference to FIG. 3B. A detailed description of the calculation method of a threshold value level is given later.

In FIG. 3B, in step S36, the binarization unit 34 binarizes the line data transferred from the line data storage unit 31 based on the threshold value level passed from the threshold value generation unit 33. Then, in step S37, the binarization unit 34 judges whether image reading is completed, and repeats the binarization process in step S36 until the reading is completed.

If an entire target area for one line is black or white, neither a white peak value nor a black peak value can be calculated. In such a case, subsequent processes can be performed using both the highest gradation maximum value (225) and the lowest gradation minimum value (0) which are prepared in advance.

FIG. 4 shows the configuration of the image reading device in the second preferred embodiment of the present invention.

The difference between the image reading devices shown in FIGS. 2 and 4 is that the image reading device shown in FIG. 4 reads color images. The description of the same part shown in FIG. 2 is omitted below.

The sensor unit 51 shown in FIG. 4 reads three colors, R (red), G (green) and B (blue), and respective digital image data corresponding to colors R, G and B are outputted from the image reading unit 5. There are two method for reading such a color manuscript: a method of switching the light sources for the respective colors R, G and B, for each line and reading all the colors using the same sensor and; a method of reading each of the colors using a sensor with a filter of the respective R, G or B color using a white light source According to the latter method, three line sensors with filters of different colors each can be used or filters of the three different colors each can be installed for each pixel of one line sensor.

In the example shown in FIG. 4, an image reading device 4 provided with three line sensors for each of the respective colors R, G and B is used. Read data corresponding to the respective colors each are outputted in parallel to the image processing units 6-1, 6-2 and 6-3.

The line data storage units 31-1, 31-2 and 31-3, gradation histogram generation units 32-1, 32-2 and 32-3, threshold value generation units 33-1, 33-2 and 33-3 and binarization units 34-1, 34-2 and 34-3, which are provided in the image processing units 6-1, 6-2 and 6-3, respectively, independently perform the respective processes for each of the R, G and B colors. Although in the image processing units 6-1, 6-2 and 6-3 shown in FIG. 4, the respective units are installed for each color, the respective unit or a part of the constituent elements of the image processing units 6-1, 6-2 or 6-3 can also be commonly shared by all the colors.

Figure 5:
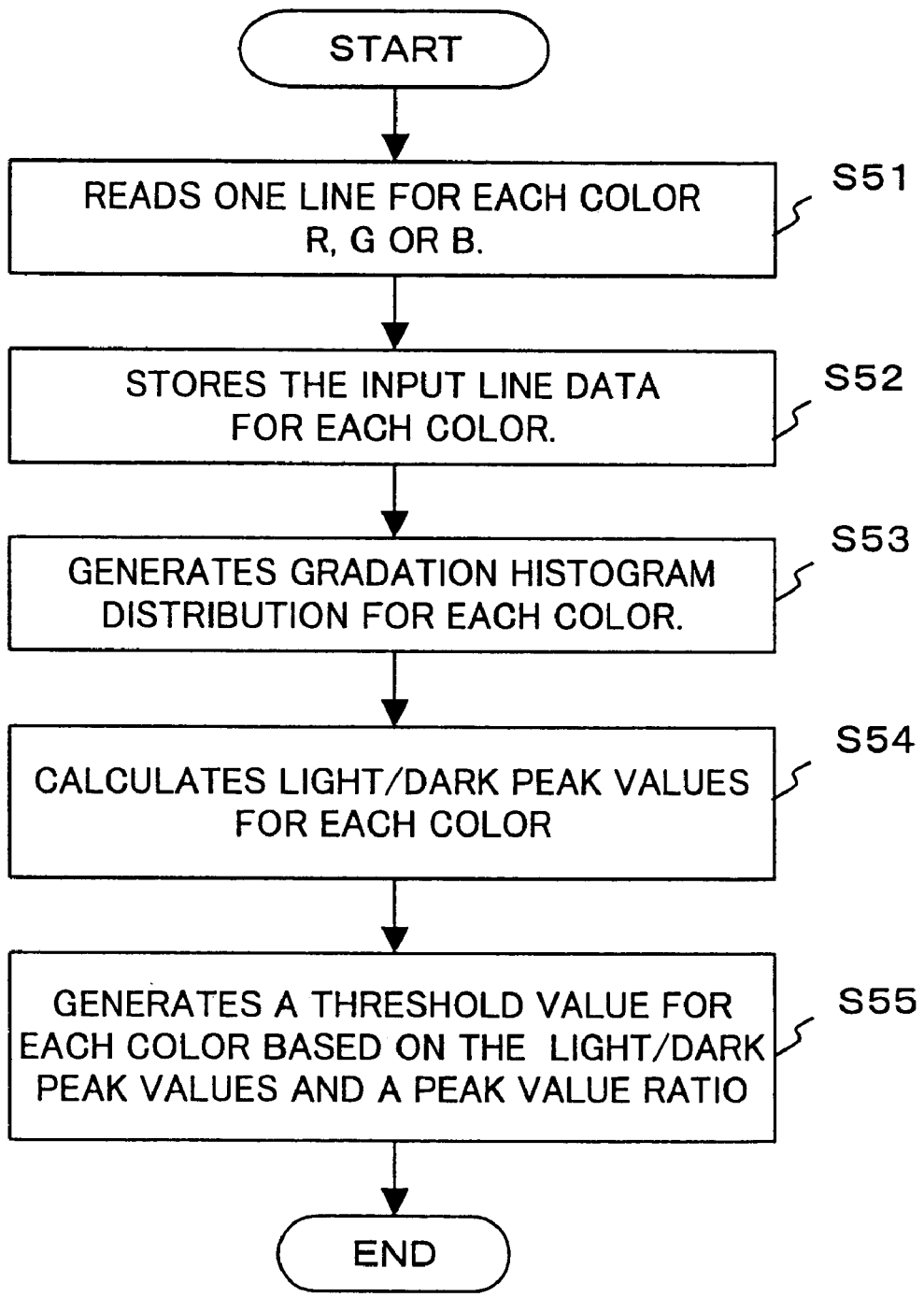
FIG. 5 is a flowchart showing the threshold value generation procedure of the image reading unit in the second preferred embodiment.
Figure 6:
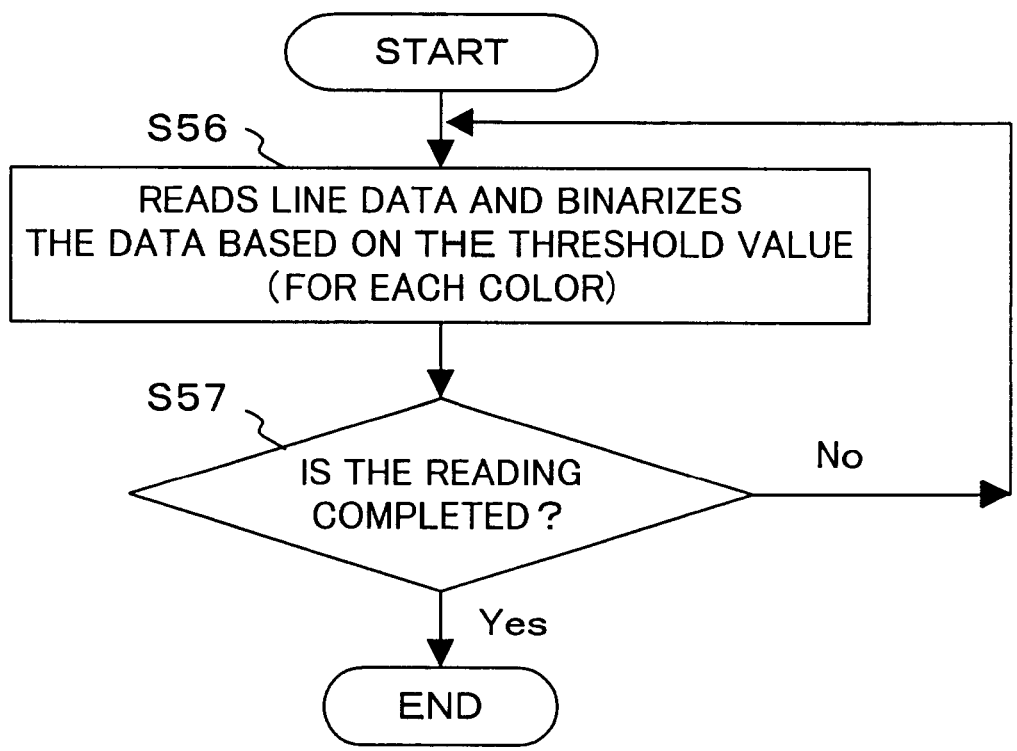
FIG. 6 is a flowchart showing the binarization procedure of the image reading unit in the second preferred embodiment.

FIG. 5 is a flowchart showing the threshold value generation procedure of the image reading unit in the second preferred embodiment, and FIG. 6 is a flowchart showing the binarization procedure of the image reading unit in the second preferred embodiment.

These FIGS. 5 and 6 correspond to FIGS. 3A and 3B in the first preferred embodiment. Only the differences, in particular those with FIGS. 3A and 3B are described below.

In step S52, image data for each color read by the image reading unit 5 in step S51 are transmitted to the line data storage units 31-1, 31-2 or 31-3 corresponding to the respective color and each group of line data are stored. In step S53, image data for each color are inputted to the gradation histogram generation unit 32-1, 32-2 or 32-3 for each color, and the generated gradation histogram distribution of read image data for each of the colors R, G and B is separately generated.

Then, in step S54, the peak values of both lightness and darkness are calculated based on the generated gradation histogram distribution, and the ratio between a light pixel and a dark pixel is calculated for each color. Then, in step S55, in the threshold value generation unit 33-1, 33-2 and 33-3 provided for each color, a threshold value level is determined for each of the colors R, G and B based on the calculated light/dark peak values and light/dark pixel ratio.

In FIG. 6, in step S56, the image data for each color from the line data storage unit 31-1, 31-2 and 31-3 are binarized based on the threshold value for each color by the binarization unit 34-1, 34-2 and 34-3, respectively.

As described above, the image reading device in the second preferred embodiment calculates generated gradation histogram distribution and determines a threshold value level for each of the colors R, G and B, unlike the image reading device in the first preferred embodiment.

FIG. 7 shows the configuration of the image reading unit in the third preferred embodiment.

FIG. 7 shows the case where color images are read like the image reading device shown in FIG. 4.

The difference with the image reading device shown in FIG. 4 is that the line sensor is shared by all the colors (a single line sensor) and image reading for each color is performed by switching light sources corresponding to the respective colors R, G and B by time division.

In the third preferred embodiment shown in FIG. 7, reading data for the respective colors R, G and B are inputted from the image reading unit 8 to the image processing unit 9 by time division. In this case, it is not necessary to provide the image processing unit 9 for each color as in FIG. 4. An image processing unit 9 common to all the colors is provided, and both the threshold value generation and binarization processes for the respective colors are performed by time division using this unit. Alternatively, a single line sensor is connected to the image processing units 9 for the respective colors as shown in FIG. 4, and the threshold value generation and binarization processes can also be performed in the respective image processing units.

The threshold value generation process is performed in almost the same way as shown in FIG. 5, and the binarization process is performed in the almost the same way as shown in FIG. 6. If there is any difference between the image reading devices shown in FIGS. 4 and 7, in the example shown in FIG. 4, both threshold value generation and image binarization processes for the respective colors can also be performed in parallel, while in the image reading 7 shown in FIG. 7, both threshold value generation and image binarization processes for the respective colors are performed by time division.

For another color image reading method, for example, there is a method of providing each pixel of a single line sensor with the respective filters R, G and B and reading images using a white light source.

Figure 8:
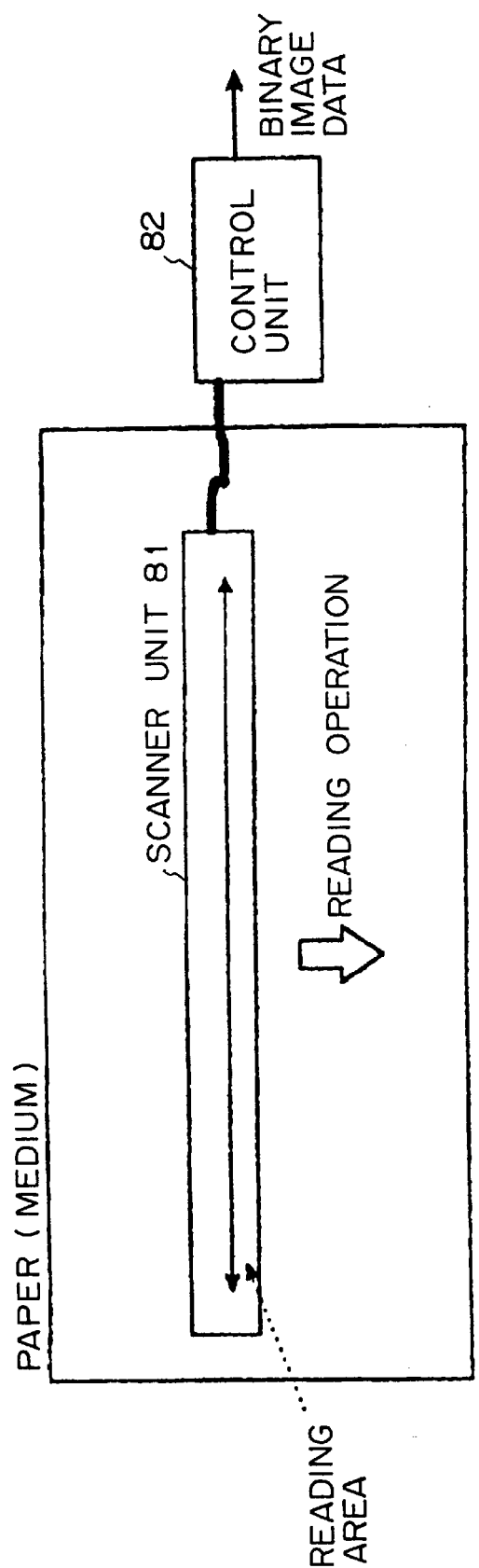
FIG. 8 shows a specific example of the image reading performed by the image reading device.

FIG. 8 shows a specific example of the image reading performed by the image reading device.

FIG. 8 shows a main part of a portable image reading device which is built into the image processing unit as described above. Although in the image reading device shown in FIG. 8, a scanner unit 81 is connected to a control unit 82, the scanner unit 81 includes the image reading unit 2, 5 or 8 described above in the first, second or third preferred embodiments, respectively, and the control unit 82 includes the image processing unit 3, 6-1, 6-2 and 63, and 9, respectively, described above in the first, second or third preferred embodiment, respectively.

The portable image reading device can be manually operated, and images are read by bringing the scanner unit 81 into close contact with a medium of paper, etc., and manually shifting the scanner unit 81 in the downward direction of the thick arrow shown in FIG. 8.

Figure 9:
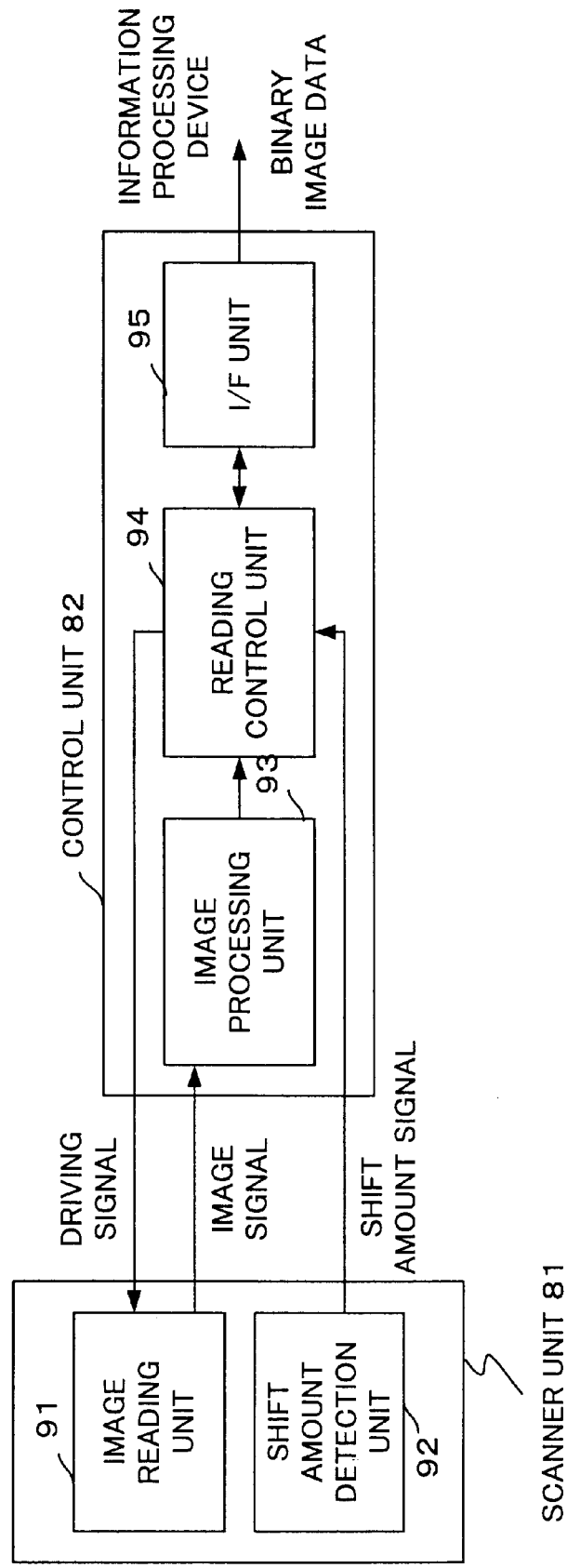
FIG. 9 shows the internal configuration of the image reading device shown in FIG. 8.

FIG. 9 shows the internal configuration of the image reading device shown in FIG. 8.

Both an image reading unit 91 including an A/D conversion unit and a shift amount detection unit 92 are provided in the scanner unit 81. The shift amount detection unit 92 detects the shift amount against a medium of the scanner unit 81, and a rotary encoder, etc., is used for the purpose. The image reading unit 91 is composed of a line sensor, a light source and a lens, and medium close-contact type image reading is performed. For the light source, an LED, a cold cathode tube, etc., are used.

In the control unit 82, both a reading control unit 94 and an interface (I/F) unit 95, which is interposed between an external device, such as an information processing device, etc., and the control unit, are provided in addition to the image processing units 3, 6-1, 6-2 and 6-3, or 9 described above in the first, second and third preferred embodiments, respectively. The control unit 82 receives a shift amount signal based on the shift amount of the scanner unit 81 which is detected by the shift amount detection unit 92, and outputs a driving signal for driving the image reading unit 91.

Figure 10:
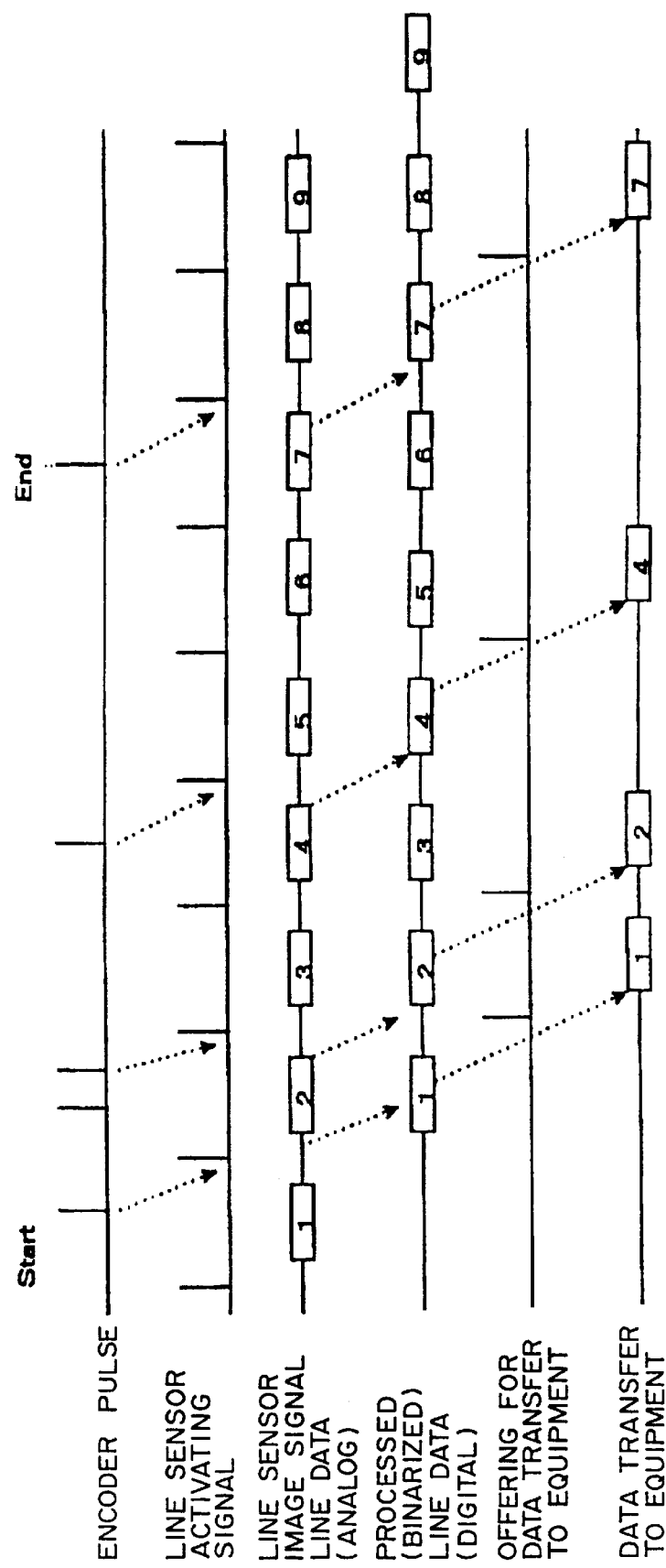
FIG. 10 shows both the flows of the reading control and data of the image reading device shown in FIGS. 8 and 9, and also shows the timing of data reading, etc.

FIG. 10 shows both the flows of the reading control and data of the image reading device shown in FIGS. 8 and 9, and if also shows the timing of data reading, etc.

In this example, a state where data for four lines are read is shown.

A reading control unit 94 always outputs a line sensor activating signal to the image reading unit 91 at specific intervals while images are read. In response to the signal, the line sensor reads images for one line and outputs the data as a line image signal. The line image signal outputted from the image reading unit 91 is transmitted to the image processing unit 93 and binarized as described above (processed (binarized) image line data shown in FIG. 10). The binarized line data are stored in a buffer provided inside the control unit 82.

The shift amount detection unit 92 converts the shift amount of the scanner unit 81 on a medium into a pulse signal using an encoder and outputs the signal. More specifically, if the scanner unit 81 shifts by a prescribed distance on the medium, one pulse signal (encoder pulse shown in FIG. 10) is outputted from the shift amount detection unit 92 to the reading control unit 94.

The reading control unit 94 monitors both the output timing of a line sensor activating signal and the input timing of an encoder pulse. If an encoder pulse is inputted immediately before a line sensor activating signal is outputted, the reading control unit 94 recognizes that the scanner unit 81 shifts one line on the medium. If an encoder pulse in not inputted between line sensor activating signals, the reading control unit 94 judges that the scanner unit 81 does not shift one line on the medium.

If the reading control unit 94 finds that the scanner unit 81 shifts one line on the medium, corresponding line image data stored in a buffer are transferred to an information processing device (PC, etc.), which is not shown in FIG. 9, connected to the image reading device. Specifically, an offering for data transfer is made to the information processing device, and image signals of a line are read when an encoder pulse is detected. In the example shown in FIG. 10, image signals 1, 2, 4 and 7 (for data transfer to the device shown in FIG. 10) correspond to these signals.

In the meantime, the image signals 3, 5, 6, 8 and 9 between which an encoder pulse is not detected are handled as invalid image signals, since it is judged that the scanner unit 81 does not shift one line. Specifically, image signals stored in the buffer are discarded, and image signals to be inputted next are stored.

Although two encoder pulses are generated while an image signal 2 is read, only the latter encoder pulse is handled as a valid pulse and the former encoder pulse is handled as an invalid pulse.

Figure 11:
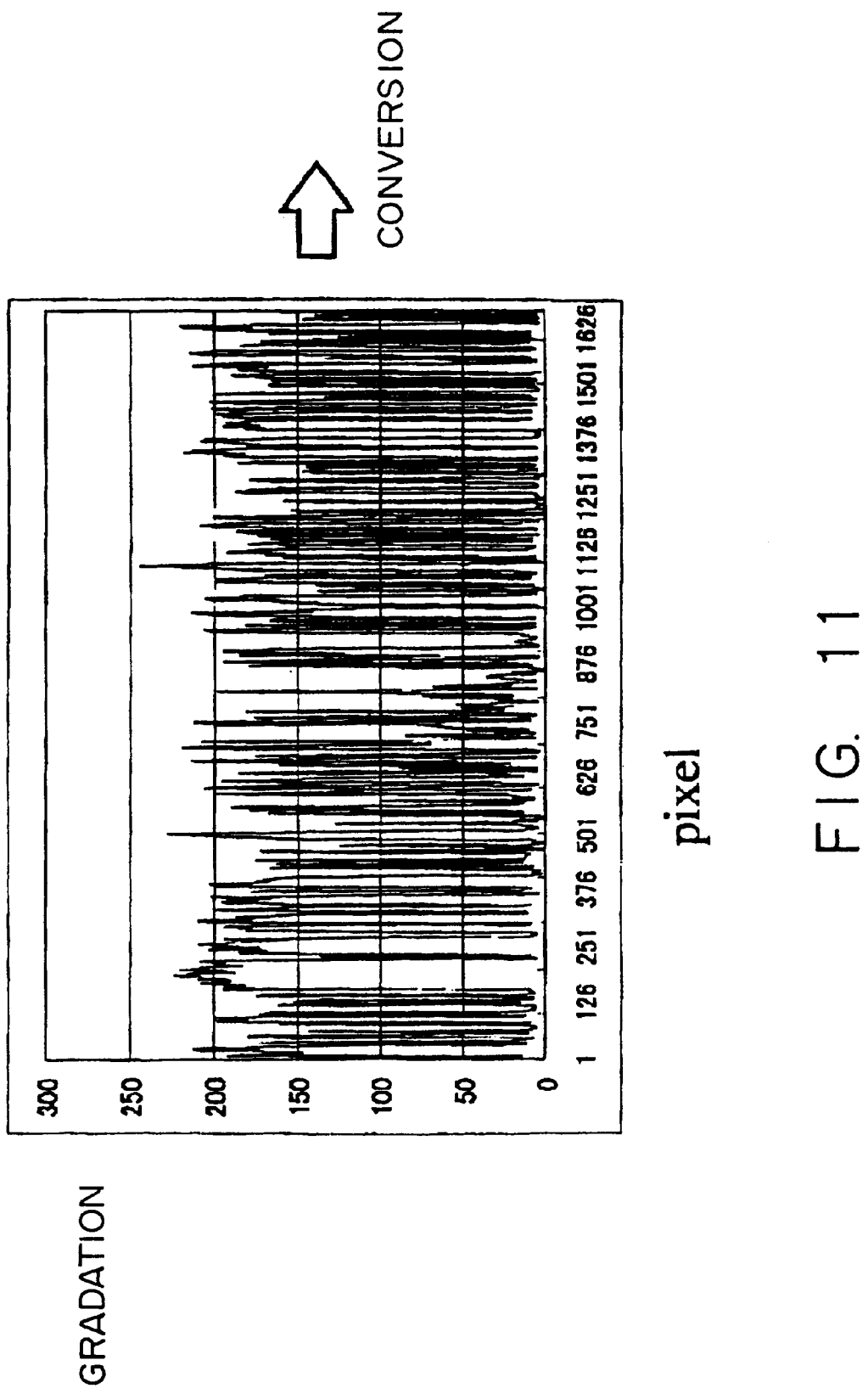
FIG. 11 shows the gradation distribution for each pixel for one line read by the image reading device.
Figure 12:
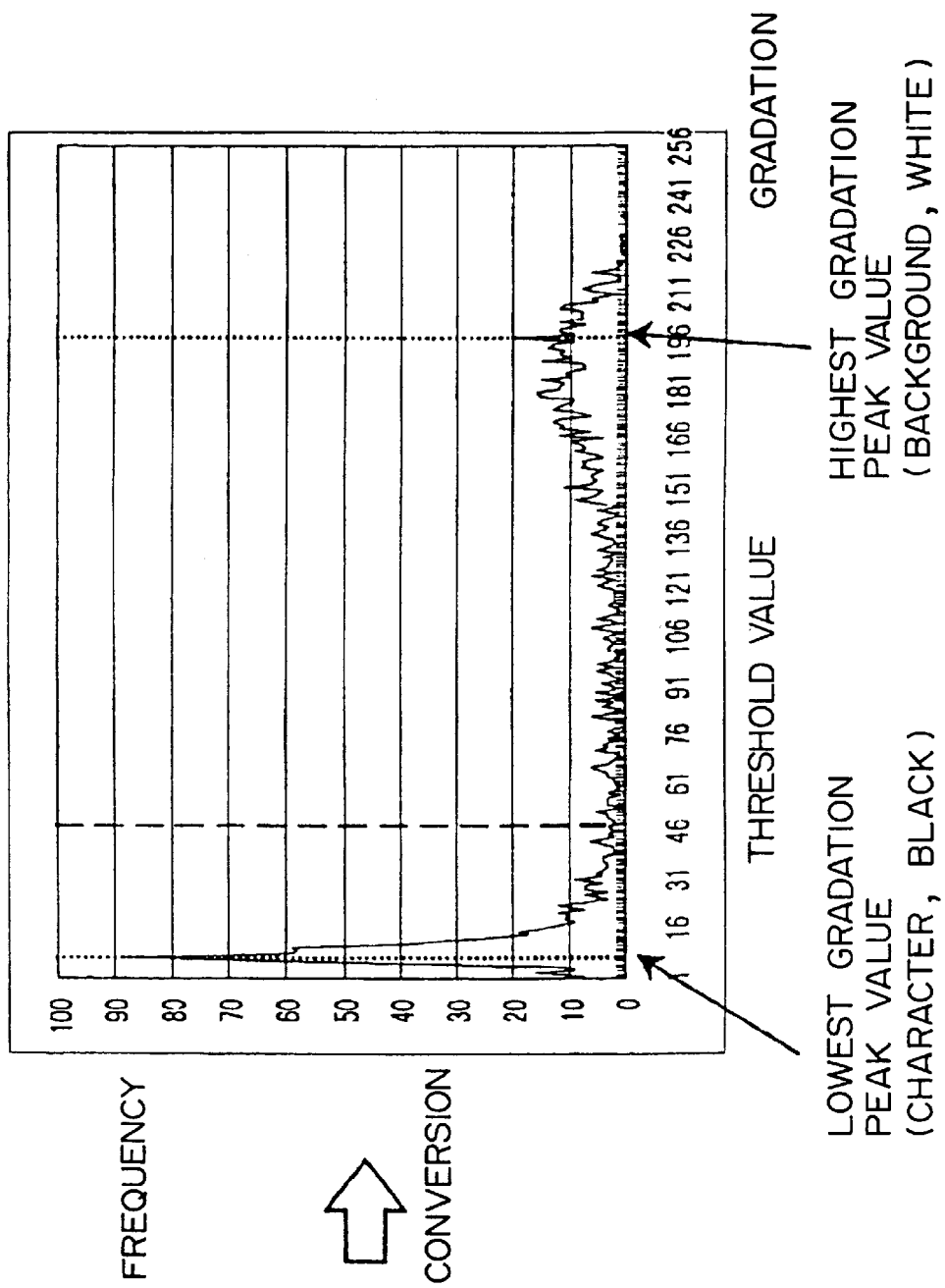
FIG. 12 shows the generated gradation histogram distribution of a read image.

FIGS. 11 and 12 show specific examples of the threshold value generation process of the present invention.

FIG. 11 shows the gradation distribution for each pixel of one line read by the image reading device, and vertical and horizontal axes indicate gradation and the number of pixels, respectively. FIG. 12 shows the gradation histogram distribution converted and generated by the gradation histogram generation unit based on the gradation distribution of one line shown in FIG. 11, and vertical and horizontal axes indicate gradation and (appearance) frequency for each gradation.

If a character area including the background of a medium and the black part of a character are read, the read image data for one line show gradation distribution, for example, as shown in FIG. 11. The greater a gradation value, the closer it is to white (light background part), and the smaller the value, the closer it is to black (a dark character/graphics part). The generated gradation histogram distribution as shown in FIG. 12 is generated based on read data for one line obtained in this way.

Both the highest gradation peak value (WP) corresponding to a white background and the lowest gradation peak value (BP) corresponding to the black part of a character can be obtained from the generated gradation histogram distribution. In the example shown in FIG. 12, the highest and lowest gradation peak values are the most frequent gradation values for the highest and lowest gradations, respectively. Even if sensor sensitivity varies depending on pixels, it can be said that the generated gradation histogram distribution shows the overall tendency of the gradation of line data. If the frequency values of the highest gradation peak value WP and lowest gradation peak value BP are assumed to be wp and bp, respectively, a highest/lowest gradation ratio indicating the ratio between the frequency values of the highest and lowest gradation peak values can be calculated according to the following equation.

$$\text{Highest/lowest gradation ratio} = wp/(wp+bp)$$

The threshold value generation unit calculates a threshold value level according to the following equation based on the highest gradation peak value, lowest gradation peak value and highest/lowest gradation ratio.

$$\text{Threshold value} = \text{Highest/lowest gradation ratio} \times (WP-BP) + BP$$

Since the threshold value level is determined in this way, the threshold value level neither falls below the lowest gradation level nor exceeds the highest gradation level, and as a result, correct binarization suited for each image is available.

For example, when an image of which the highest gradation peak value and lowest gradation peak value are the same, a threshold value for binarization is determined regardless of the gradation of the image, if a frequency value is not taken into consideration. The threshold values which are themselves used for binarization in the case where an image that is completely dark is read and in the case where an image that is completely light is read become the same. However, in these preferred embodiments, the frequencies of the respective peak values is taken into consideration when the threshold value is determined. Therefore, the threshold value can be changed based on the ratio between the frequencies of the respective peak values (indicating the tendency of whether the image is black or white as a whole), and as a result, binarization suited for the respective states of an image is available.

Figure 13:
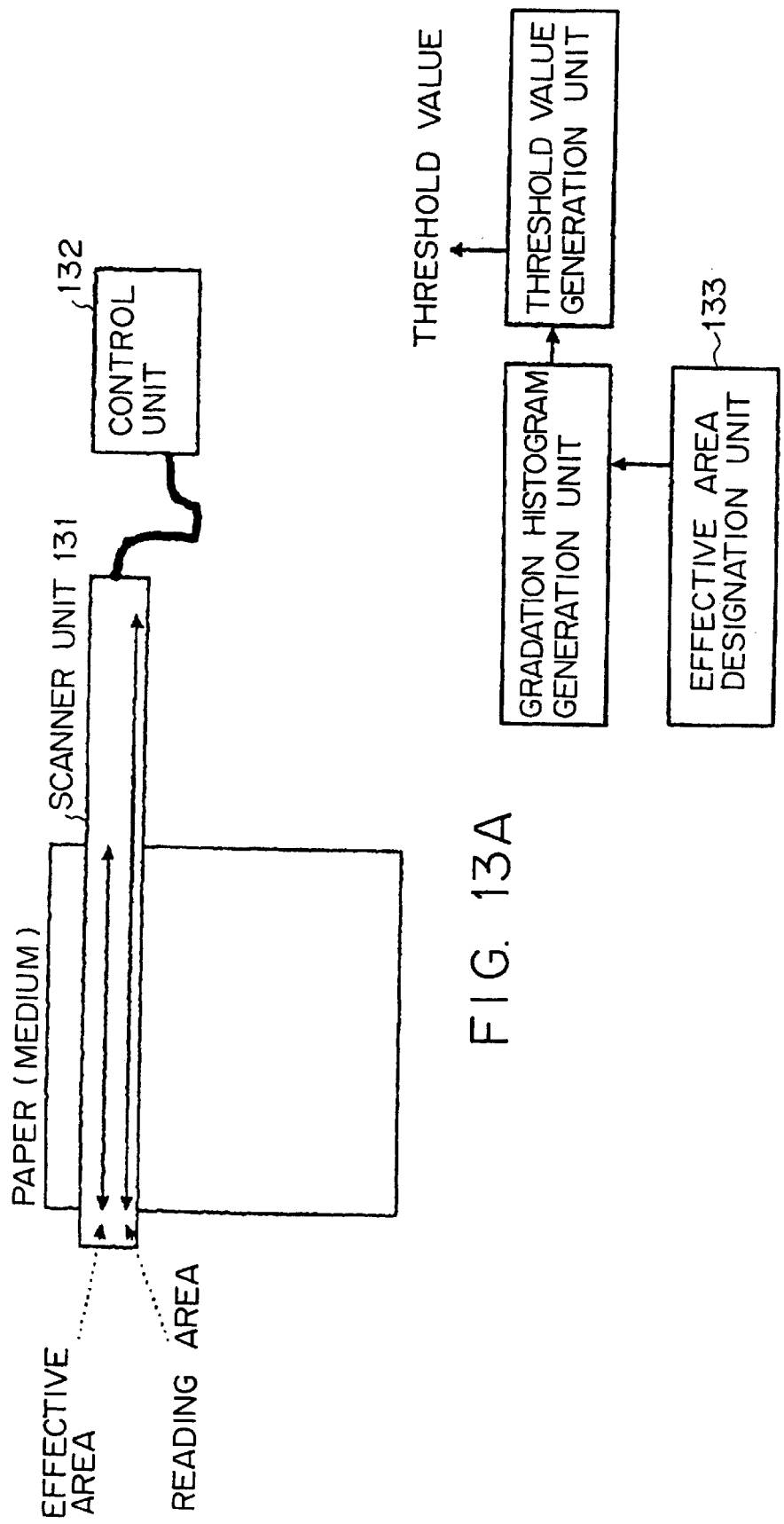
FIGS. 13A and 13B show the image reading in the fourth preferred embodiment of the present invention.

FIGS. 13A and 13B show the image reading in the fourth preferred embodiment of the present invention, and show the case where the width of an image on a piece of paper (medium) is smaller than the reading area of a scanner unit 131.

In FIG. 13A, double-ended arrows in the upper section and in the lower section of the scanner unit 131 indicate the effective area of the paper and the reading area of the scanner unit 131, respectively.

If the medium width to be read is smaller than the reading area of the scanner unit 131 and if an image for one line is read, data outside the medium are also inputted. However, if these pieces of data outside the medium are used to generate a threshold value, gradation distribution different from the gradation distribution of an actual medium is obtained. Therefore, there is a very high possibility that a correct binary threshold value may not be obtained.

In such a case, an effective area to be read is designated using an effective area designation unit 133. This is possible, for example, by designating the size of a piece of paper to be read. An effective area width can also be directly designated.

By designating an effective area in this way, generated gradation histogram distribution using only data inputted from a restricted position on a line can be generated.

FIG. 14 shows the read image gradation distribution in the case where an effective area is smaller than a reading area.

In FIG. 14, vertical and horizontal axes indicate an output value (gradation) and the number of pixels, respectively.

The left and right sides of a broken line correspond to an effective area (on a medium) and read data outside the medium, respectively. By designating a reading area as shown in this fourth preferred embodiment, a threshold value can be generated based on only reading data existing within an effective area, and as a result, correct binarization is available.

FIGS. 15A, 15B, 16 and 17 show the relationship between the line input data storage process of images performed to determine a threshold value and the reading process of actual images in each of the preferred embodiments described above.

The line input methods for determining a threshold value are as follows.

(1) Separate Process Type

According to this method, one line is inputted using a medium different from a medium of which the images are actually read (manuscript), generated gradation histogram distribution is calculated and a threshold value is determined. After that, both the reading and binarization processes of images are performed using the determined threshold value.

(2) Pre-Reading Type

According to this method, prior to the commencement of image reading, one line of the leading line on a medium (manuscript) is inputted, and a threshold value is determined based on an obtained generated gradation histogram distribution. Both the image reading and binarization processes after that are performed based on the threshold value determined when the leading line is read.

(3) Post-Reading Type

According to this method, one line of the end line on a medium (manuscript) is inputted, and a threshold value is determined based on the generated gradation histogram distribution of this line. This threshold value is used in the binarization process for a subsequent manuscript reading.

(4) Step-By-Step Type

According to this method, a threshold value is determined based on a generated gradation histogram distribution for each inputted line at the same time the line input of images is performed. Then, the reading and binarization processes of images are performed based on the determined threshold value. According to this step-by-step type, since a binarization process is always performed based on the latest threshold value, the binarization process can be performed using a threshold value suited for a medium (manuscript) to be read.

For example, FIGS. 15A and 15B show a state where the center of a medium (manuscript) is read. If input data are stored in the position of a scanner unit 151 shown in FIG. 15A and a threshold value is generated based on the generated gradation histogram distribution, the subsequent reading and binarization processes of images (FIG. 15B) are performed based on this threshold value.

FIG. 16 is a flowchart showing a threshold value generation process, and shows a procedure for generating a threshold value based on the end line of images.

The process shown in FIG. 16 can be largely divided into two processes: a reading/binarization process and a threshold value generation process.

If in step S161, line data are read, the binarization process of image data are performed using a set threshold value. Then, in step S162, it is judged whether reading is completed. If the reading is not completed, in step S161, both the reading and binarization processes of the images of a subsequent line are performed.

In the meantime, if in step S162 it is judged that the reading of one medium (manuscript) is completed, in step S163, data for one line are read and are temporarily stored in the line data storage unit. Then, in step S164, generated gradation histogram distribution is calculated based on the image data for one line stored in the line data storage unit, and both white/black peak values and a white/black pixel ratio are calculated.

Then, in step S165, a threshold value is generated based on both the calculated white/black peak values and white/black pixel ratio.

After that, if a subsequent medium (manuscript) is read, the threshold value generated in step S165 is used.

FIG. 17 is a flowchart showing another threshold value generation procedure.

In the example shown in FIG. 17, a new threshold value is generated every time a prescribed number of lines are read.

In FIG. 17, in step S171 it is judged whether N (prescribed number) lines are read. If N lines are read (YES in step S171), in step S172, line data for one line are read and are stored in the line data storage unit. Then, in step S173, gradation histogram distribution is generated, and both white/black peak values and a white/black pixel ratio are calculated.

Then, in step S174, a threshold value is generated based on both the calculated white/black peak values and white/black pixel ratio.

If in step S171 it is judged that images for N lines are not read (NO in step S171), the processes in steps S172 through S174 are skipped.

Then, in step S175, the read line data are binarized. If in step S171 it is judged to be NO, binarization is performed using a threshold value generated immediately before (in the first case, a set initial value).

If in step S171 it is judged to be YES, images are binarized using the threshold value generated in steps S172 through S174.

After that, the processes in steps S171 through S176 are performed until the reading of the medium (manuscript) is completed.

As described above, in the example shown in FIG. 17, a threshold value is sequentially updated every time N lines are read. Although there is a possibility that the distribution of white/black colors, even on the same medium (manuscript) may vary depending on the respective parts even on the same medium (manuscript), in the example shown in FIG. 17, binarization is available using a more appropriate threshold value, since a threshold value generated based on the reading result in the vicinity of a line to be read is used.

Although in the examples described above, a threshold value is generated using the gradation peak ratio of one line, it goes without saying that the threshold value can also be generated based on the reading result of a plurality of lines.

Figure 18:
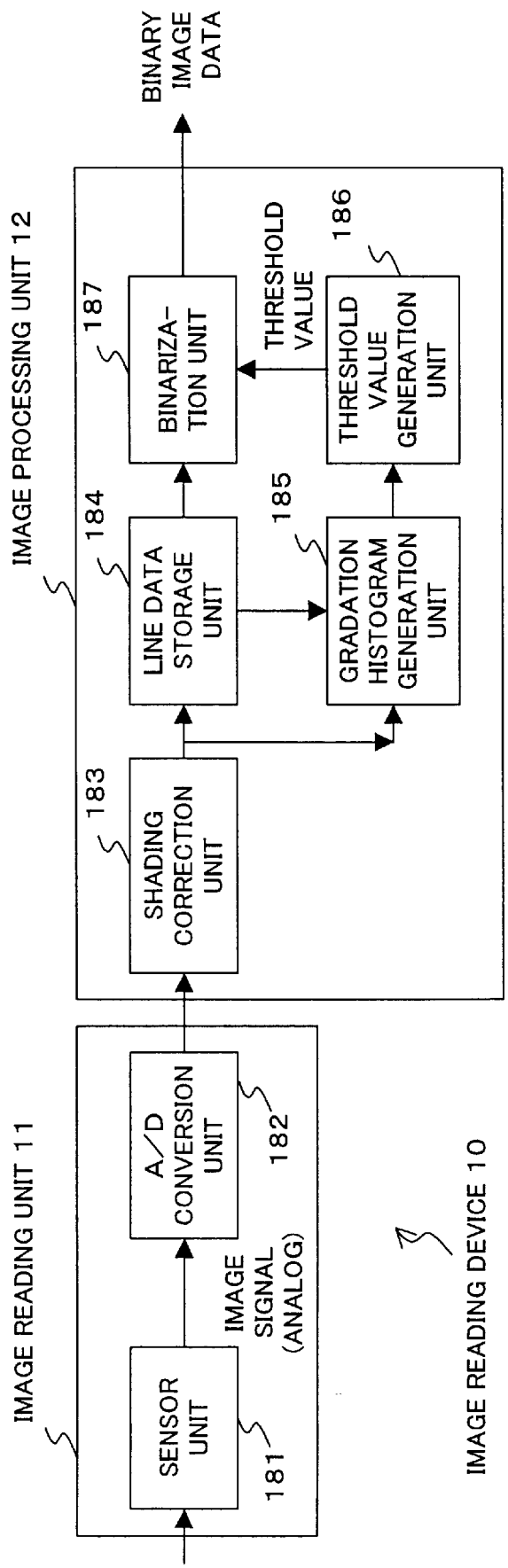
FIG. 18 shows the configuration of the image reading device (for performing shading correction) in the fifth preferred embodiment of the present invention.

FIG. 18 shows the configuration of the image reading device in the fifth preferred embodiment of the present invention.

The image reading device 10 shown in FIG. 18 is characterized in generating a gradation histogram, detecting peak values and generating a threshold value after making a shading correction of images read by an image reading unit 11.

Line data of which the shading is corrected by a shading correction unit 183 are inputted to a line data storage unit 184. Line data to be inputted to a gradation histogram generation unit 185 are also shading-corrected. In this way, the influence of surface unevenness, etc., is removed by the shading correction of the shading correction unit 183.

If shading is corrected, a medium (manuscript) with a white background is read in advance, and the background value of this medium is stored as a white shading correction value. If a digital signal to be inputted from the image reading device is assumed to be eight bits (white: 255, black: 0), the image signal to be inputted from the image reading device is converted and outputted by the shading correction unit 183 according the following equation.

$$Y(i)=255 \times X(i)/WW(i)$$

However, in the equation, X(i), Y(i) and WW(i) are an input image signal, a corrected signal and a white shading correction value, respectively.

A threshold value can also be generated using such a shading-corrected signal.

As described above, according to the present invention, a threshold value corresponding to the features of an image to be read can be generated, an optimal threshold value suitable for a medium (manuscript) can be obtained, and as a result, correct binarization is available.

Although the preferred embodiments of the present invention have been described above with reference to the drawings, it goes without saying that both the image reading device and image processing unit of the present invention are not limited to the preferred embodiments described above and both the image reading device and image processing unit can be individual single units, a system or integrated device consisting of a plurality of units, or a system in which processes are performed via a network, such as a LAN (Local Area Network), WAN (Wide Area Network), etc., only if the functions are implemented.

The functions in the preferred embodiments of the present invention can be implemented by a system composed of a CPU (Central Processing Unit), a memory, such as ROM (Read-Only Memory) and RAM (Random Access Memory), an input device, an output device, an external storage device, a medium driving device, a portable storage medium and a network connection device. It goes without saying, specifically, that the functions in the preferred embodiments of the present invention can be implemented by providing an experimental knowledge utilizing device with a memory, such as ROM and RAM, on which the program codes of software for implementing the system of the preferred embodiment described above are recorded, an external storage device and a portable storage medium, and enabling the computer of the experimental knowledge utilizing device to read and execute the program codes.

In this case, the program codes read from the storage medium themselves implement the new functions of the present invention, and the portable storage medium, etc., on which the program codes are recorded configures the present invention.

For the portable storage medium for providing the program codes, for example, a floppy disk, a hard disk, an optical disk, a magneto-optical disk, a CD-ROM, a CD-R, a DVD-ROM, a DVD-RAM, a magnetic tape, a non-volatile memory card, a ROM card, a variety of storage media on which program codes are recorded via a network connection device, such as electronic mail, personal computer communications, etc., (in other words, a network) can be used.

Although the functions of the preferred embodiments described above can be implemented by enabling the computer to read the program codes in the memory, the functions can also be implemented by enabling an OS, etc., running on the computer to execute a part or all of the actual processes according to the instruction of the program codes.

After the program codes read from the portable storage medium are written in a memory provided in a function extension board inserted in the computer or a function extension unit connected to the computer, the functions of the preferred embodiments described above can be implemented by enabling a CPU, etc., provided in the function extension unit or function extension unit to execute a part or all of the actual processes according to the instruction of the program codes.

In other words, the present invention is not limited to the preferred embodiments described above, and the present invention can take a variety of configurations and forms as long as the subject matter of the present invention is secured.

What is claimed is:

1. An image reading method reading an image recorded on a medium, comprising:
    getting a lowest gradation value and a highest gradation value of the image recorded on the medium;
    calculating an appearance frequency ratio based on an appearance frequency corresponding to the lowest gradation value and the highest gradation value;
    determining a threshold value level used for a binarization process of the image based on the calculated appearance frequency ratio and the largest and highest gradation values; and
    binarization the image based the threshold value level.

2. An image reading method reading an image recorded on a medium, comprising:
    getting a gradation histogram distribution of the read image;
    calculating an appearance frequency ratio between a lowest gradation value and a highest gradation value based on the gradation histogram distribution;
    determining a threshold value level based on the calculated appearance frequency ratio; and
    binarizing the read image based on the threshold value level, wherein said lowest gradation value is the most frequent low gradation value from a plurality of low gradation values and said highest gradation value is the most frequent high gradation value from a plurality of high gradation values.

3. The image reading method according to claim 2, wherein
    the lowest gradation value and the highest gradation value are most frequent low gradation value and a most frequent high gradation value, respectively.

4. An image reading device, comprising:
    an image reading unit to read an image recorded on a medium;
    a threshold value generation unit to calculate an appearance frequency ratio between a lowest gradation value and a highest gradation value from image data read from the image reading unit and to determine a threshold value level based on the calculated appearance frequency ratio; and
    a binarization unit to binarize the image data read based on the determined threshold value level, wherein said lowest gradation value is the most frequent low gradation value from a plurality of low gradation values and said highest gradation value is the most frequent high gradation value from a plurality of high gradation values.

5. The image reading device according to claim 4, wherein
    said image reading unit reads a plurality of colors,
    said threshold value generation unit calculates a ratio between the lowest gradation and the highest gradation value for each piece of image data corresponding to each color read by said image reading unit and determines a threshold value level for each color; and
    said binarization unit binarizes image data corresponding to each color based on the threshold value level determined for each color.

6. The image reading device according to claim 4, further comprising:
    a gradation histogram generation unit to generate a gradation histogram distribution of the image data read by said image reading unit, wherein
    said threshold value generation unit determines the threshold value level based on the gradation histogram distribution generated by said gradation histogram generation unit.

7. The image reading device according to claim 5, further comprising:
    a gradation histogram generation unit to generate a gradation histogram distribution of the image data read by said image reading unit, wherein
    said threshold value generation unit determines the threshold value level based on the gradation histogram distribution generated by said gradation histogram generation unit.

8. An image processing device, comprising:
    a unit to generate a gradation histogram distribution of inputted image data;
    a unit to calculate a low gradation peak value and a high gradation peak value based on the generated gradation histogram distribution;
    a unit to determine a threshold value level based on an appearance frequency ratio determined from a ratio between the low gradation peak value and the high gradation peak value; and
    a unit to binarize the inputted image data based on the threshold value level, wherein said low gradation peak value is the most frequent low gradation peak value from a plurality of low gradation peak values and said high gradation peak value is the most frequent high gradation peak value from a plurality of high gradation peak values.

9. The image processing device, comprising:
    a unit to calculate a lowest gradation value and a highest gradation value of inputted image data;
    a unit to determine a threshold value level based on an appearance frequency ratio determined from a ratio between the lowest gradation value and the highest gradation value; and
    a unit of binarize the input image data based on the threshold value level, wherein said lowest gradation value is the most frequent low gradation value from a plurality of low gradation values and said highest gradation value is the most frequent high gradation value from a plurality of high gradation values.

10. A computer-readable storage medium on which is recorded an image reading program enabling a computer to execute a process, comprising:

getting a lowest gradation value and a highest gradation value of the image recorded on the medium;

calculating an appearance frequency ratio between the lowest gradation value and the highest gradation value;

determining a threshold value level used for a binarization process of the image based on the threshold value level, wherein said lowest gradation value is the most frequent low gradation value from a plurality of low gradation values and said highest gradation value is the most frequent high gradation value from a plurality of high gradation values.

11. A computer-readable storage medium on which is recorded an image reading program enabling a computer to execute a process, comprising:

getting a gradation histogram distribution of the read image;

calculation an appearance frequency ratio between a lowest gradation value and a highest gradation value based on the gradation histogram distribution;

determining a threshold value level based on the calculated appearance frequency ratio; and binarizing the read image based on the threshold value level.

12. An image reading device, comprising:

image reading means for reading an image recorded on a medium;

threshold value generating means for calculating an appearance frequency ratio between a lowest gradation value and a highest gradation value from image data rad from the image reading means and for determining a threshold value level based on the calculated appearance frequency ratio; and binarizing means for binarizing the image data read based on the determined threshold value level.

* * * * *